United States Patent [19]

Hayles

[11] 4,423,939

[45] Jan. 3, 1984

[54] LENS ATTACHMENT AND METHOD FOR MULTIPLE IMAGING

[76] Inventor: David C. Hayles, 11403 Sagestanley, Houston, Tex. 77089

[21] Appl. No.: 302,291

[22] Filed: Sep. 3, 1981

[51] Int. Cl.³ ............................................. G03B 41/00
[52] U.S. Cl. ................................................. 354/122
[58] Field of Search ..................... 354/120, 122, 125

[56] References Cited

U.S. PATENT DOCUMENTS

| | | | |
|---|---|---|---|
| 678,490 | 7/1901 | Hug | 354/122 |
| 1,533,433 | 4/1925 | Linden | 354/122 |
| 2,186,610 | 1/1940 | Leavitt et al. | 354/122 |
| 3,318,218 | 5/1967 | Yax | 354/122 |
| 4,012,748 | 3/1977 | Lemanski | 354/122 |

*Primary Examiner*—John Gonzales
*Attorney, Agent, or Firm*—Charles H. De La Garza

[57] ABSTRACT

A multiple imaging attachment 30 is provided for achieving proper multiple imaging when the amount of light is changed to expose different positions of a film frame. The multiple imaging attachment 30 is coupled to a camera 10 so that an opening 60 in the multiple imaging attachment will transmit light to a lens 14 and the opening 60 and is rotatable to direct light to selected portions of the lens 14 to expose selected portions of the film frame. The mask 64 is slidably mounted to move along a predetermined path transverse to the camera lens 14 to maintain a defined relationship between the mask and the lens and compensate for the changes in light. When the amount of light is changed while exposing different selected portions of a film frame the mask is selectively moved to maintain the defined relationship between the mask and the lens thereby assuring the necessary blending and overlapping between adjacent exposures to provide proper multiple imaging.

3 Claims, 11 Drawing Figures

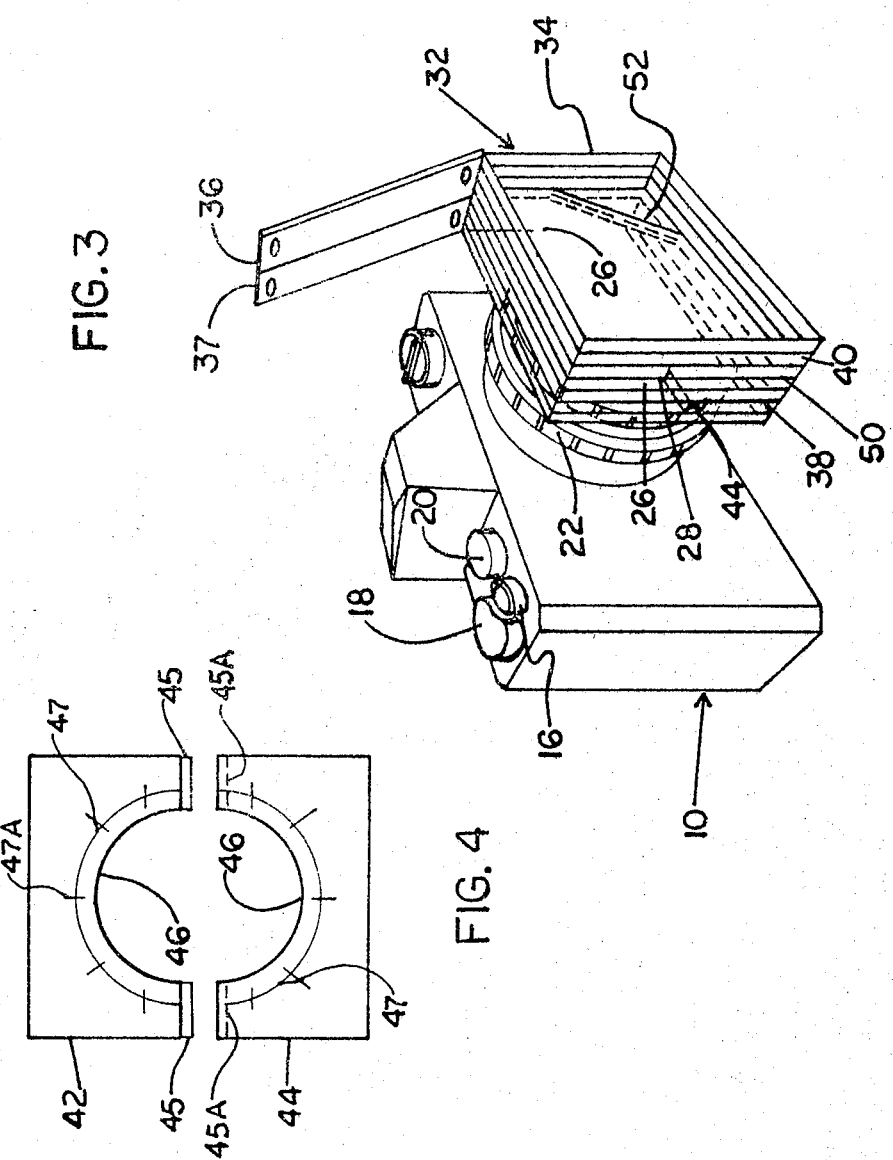

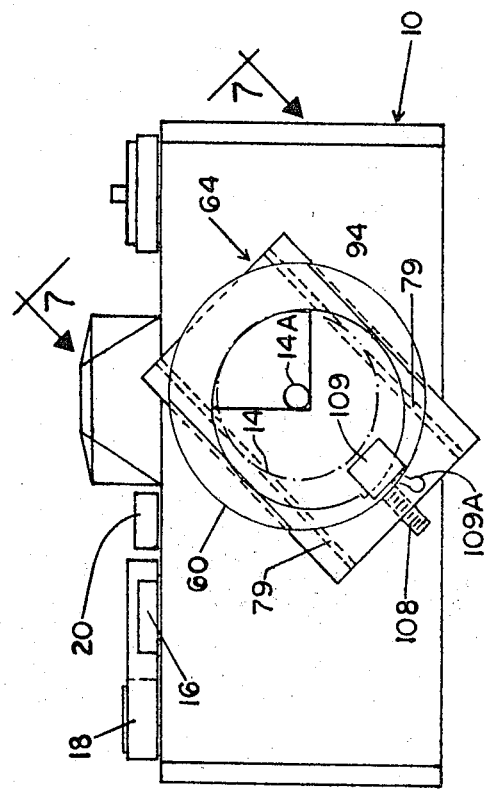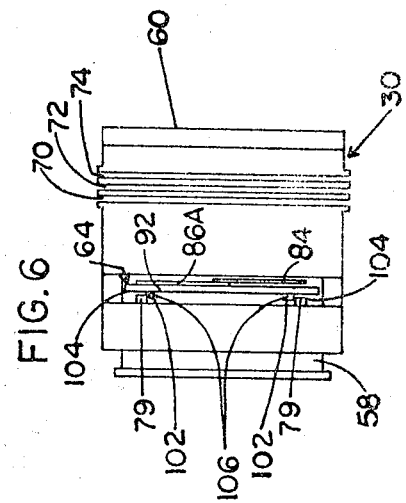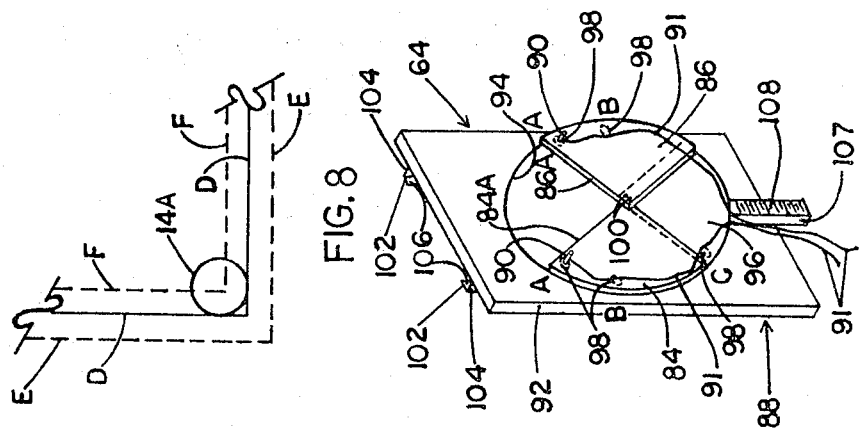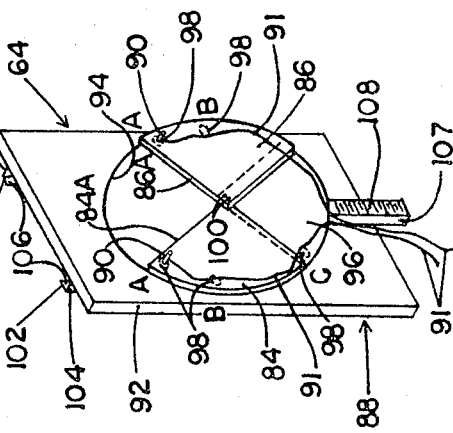

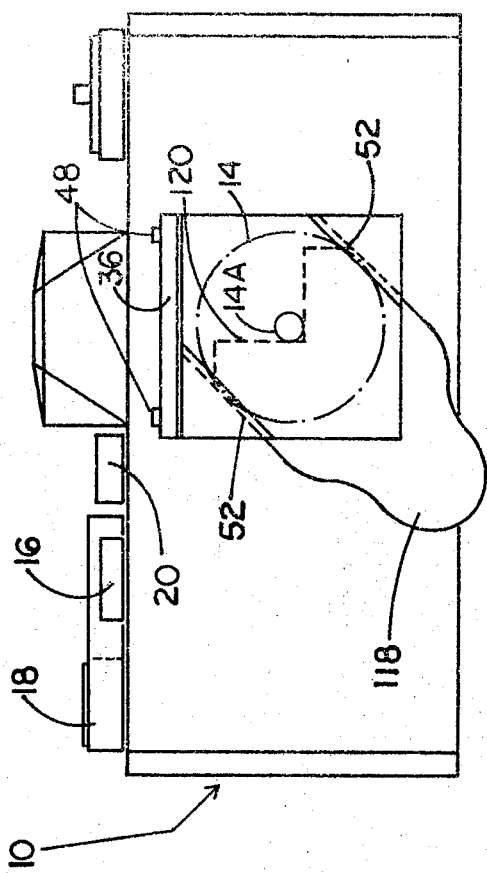

LENS ATTACHMENT AND METHOD FOR MULTIPLE IMAGING

TECHNICAL FIELD

The invention relates to a multiple imaging camera lens attachment and method for facilitating multiple imaging and more particularly to such an attachment and method which will allow multiple exposures upon a single film frame when the amount of light used during the exposure of the different sections of the film is selectively changed.

The use of multiple imaging has been a popular photography technique over the years. One reason for this popularity is because it contributes to the conservation of film. When multiple imaging, it is often desirable to record a plurality of seperate and distinct pictures. That is, there is a need for definite demarcation in the boundary between adjacent pictures on the same film frame. This is generally readily acheivable with known multiple imaging devices because the devices themselves have movable aperture arrangements to selectively expose different sections of the film to light. These movable aperture arrangements are in themselves miniature displaceable camera apertures which are generally charaterized by a sharp outline. The result is that light passing through the aperture will give a sharp frame thus giving an appearance of lines of demarcation.

On the other hand, the more common application for multiple imaging dictates that there be an appearance of simultaneity. That is, it is desirable to avoid the appearance of demarcation between the separate sections of the film frame at different times. In this instance there is a need to blend the marginal edges of each exposure with the adjacent exposures.

This can be a difficult problem because the very nature and structure of traditional multiple imaging devices give an appearance of lines of demarcation. There have been some attempts to solve this problem by controlling the varied components of light that exist while multiple imaging. These attempts however have been for those situations when the amount of light directed to the lens is constant as the different exposures are taken on the different sections of the film.

This problem is even more drastic when the amount of light to the lens is selectively changed, by changing the F/stops of the camera, as the different exposures are taken on the different sections of the film. Of course such changes in the amount of light directed to the lens to expose the film can be desirable while multiple imaging to allow greater flexibility in taking pictures, such as for example, when some of the subjects or objects to be photographed are different distances from the camera lens than the others.

BACKGROUND ART

Attempts have been made to provide means for blending and overlapping the exposures so that the marginal edges of each exposure are blended with adjacent exposures. One such arrangement has been a curtain arrangement utilizing movable curtain members adjustable to provide an exposure opening of sufficient size to expose only the desired portion of the film positioned in the camera. Since the curtains on the camera lens head are adjacent to the camera lens, the marginal edges of each exposure are not clear cut but are blended into the adjacent exposure. U.S. Pat. No. 3,122,077 discloses another arrangement employing a cylindrical shaped Hood member having an aperture formed therein which is mounted for rotation about the lens of the camera. The hood member is provided with an arrangement of baffles about the aperture so that light entering the aperture will be diffused along the boundaries of the aperture thus creating a blurred outline and blending of the marginal edges of each exposure.

Still another arrangement is disclosed in U.S. Pat. No. 3,135,184 which provides a mask structure formed of overlapping sections which blends marginal edges of the different exposures.

Although these devices attempt to assure that the marginal edges of adjacent exposures are blurred rather than sharply defined these devices are only applicable to situations where the amount of light directed to the lens is constant during each exposure. That is, each exposure on the film is taken at a constant F/stop. There is no provision for compensating for changes in the amount of light directed to the lens while multiple imaging.

DISCLOSURE OF THE INVENTION

The invention relates to a method of multiple imaging and a multiple imaging attachment to be utilized with a camera which is adjustabe to provide varying amounts of light to the lens of the camera for exposing the film. The attachment in accordance with the present invention includes a housing having an opening formed therein for allowing light to be transmitted longitudinally through the housing. A means is provided for masking the opening in the housing and for compensating for changes in the amount of light used to expose different portions of the film. A means is provided for coupling the housing to the camera so that the opening in the housing is aligned to transmit light to the lens and for facilitating rotation of the masking and compensating means so that light is directed to selected portions of the lens. Still further a means is provided for facilitating movement of the masking and compensating means alone a predetermined path in the housing when the amount of light is changed to expose different selected portions of the film so that the masking and compensating means can be moved a predetermined distance relative to the lens to compensate for changes in the amount of light used to expose the different film portions.

In accordance with the method of the present invention a mask is positioned adjacent to the camera lens to allow the transmission of light to a predetermined portion of the lens to facilitate exposure of a selected portion of the film frame. Selected predetermined portions of the mask are then aligned with a selected predetermined portion of the camera lens. The selected portion of the film is then exposed. The film frame is then again aligned with the camera lens to allow another exposure thereon. Once this is done the mask is positioned adjacent to the camera lens to allow the transmission of light to another predetermined portion of the camera lens to facilitate exposure of a different portion of the film frame. The camera is adjusted to change the amount of light transmitted to the camera lens. The mask is then moved a predetermined distance along a diagonal predetermined path adjacent to the camera lens to compensate for the change in the amount of light transmitted to the camera lens and the different portion of the film frame is exposed.

BRIEF DESCRIPTION OF THE DRAWING

The details of the invention will be described in connection with the accompanying drawing in which:

FIG. 3 is an enlarged view taken along lines 3—3 of FIG. 2;

FIG. 4 is a view illustrating the locking members forming a part of the preferred embodiment of the invention;

FIG. 5 is a perspective view of an inner mask member forming a part of the multiple imaging attachment;

FIG. 6 is an enlarged view taken along lines 6—6 of FIG. 2;

FIG. 7 is enlarged view take along lines 7—7 of FIG. 6;

FIG. 8 is a view illustrating the effect light changes has on the appearance of mask alignment;

FIG. 11 is a enlarged view taken along lines 11—11 of FIG. 10.

BEST MODE FOR CARRYING OUT THE INVENTION

Figure 1:
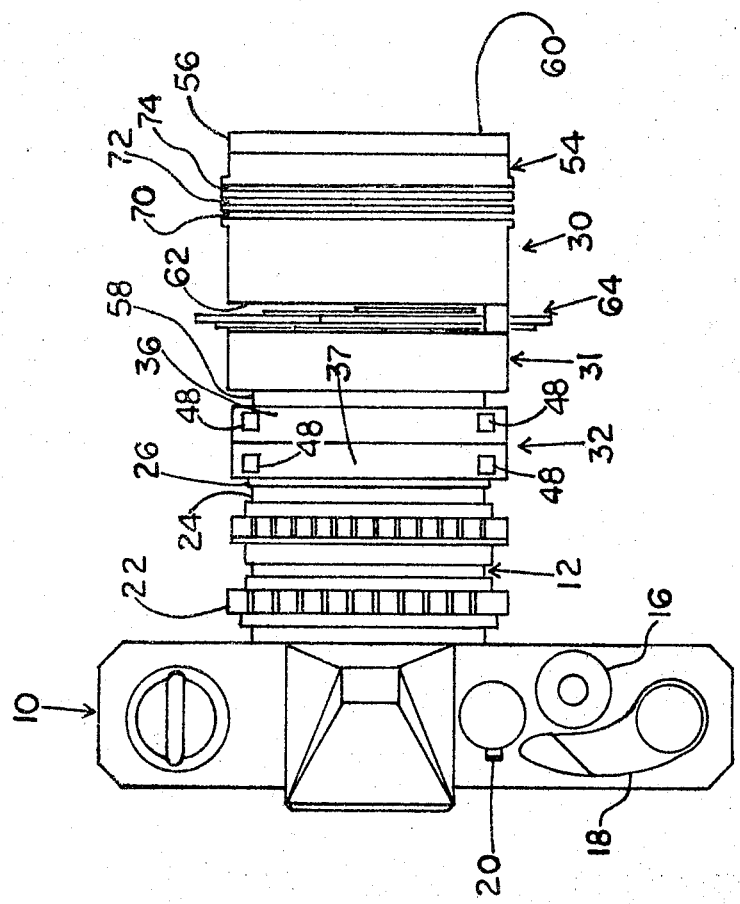
FIG. 1 is plan view of a camera having a multiple imaging attachment illustrating the preferred embodiment of the invention.
Figure 2:
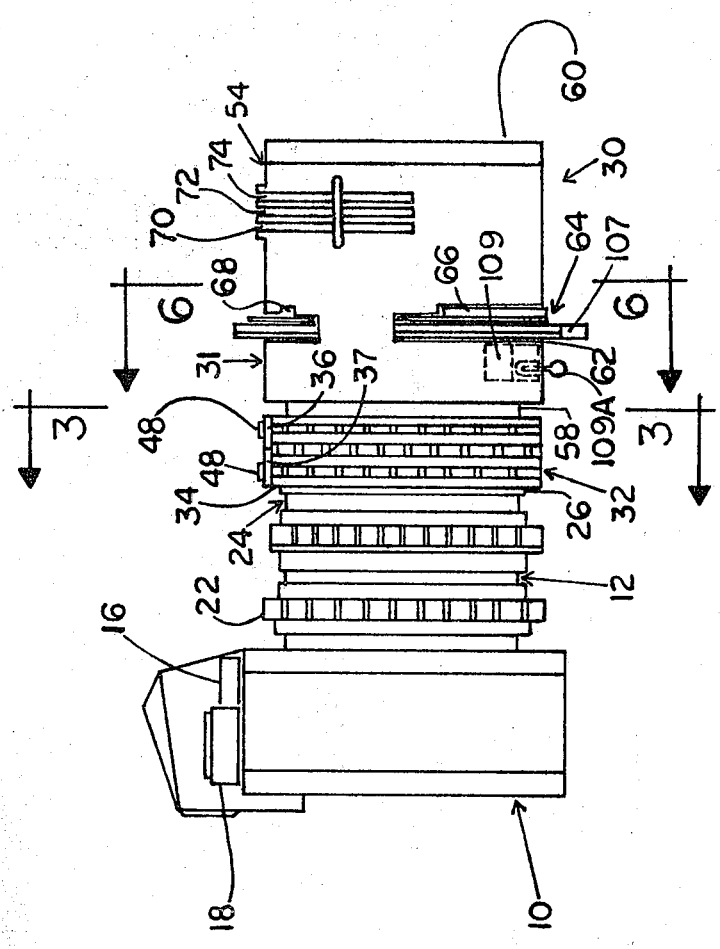
FIG. 2 is a side view of the camera and multiple imaging attachment illustrated in FIG. 1.

Referring to FIGS. 1 and 2 there is shown a camera 10, such as for example a 35 mm camera, having a forwardly projecting cylindrical lens housing 12, which supports a lens 14 (FIG. 6). The camera 10 includes a control switch 16 for activating or deactivating the camera and a film control lever 18. The film control lever 18 is rotatable in a counterclockwise direction to prevent a film frame previously exposed in the camera 10 from being advanced when the film control lever 18 is activated to reset the exposure mechanism of the camera. By repeating this process a user may take more than one exposure on a single film frame. The camera 10 also includes an F/stop control mechanism 22. The F/stop control mechanism 22 can be rotated in a well known manner to control the amount of light directed to the lens 14 to expose the film.

A plurality of inner threads (not shown) is provided at the end of the lens housing 12 nearest the lens 14 to allow a lens housing extension 24 having a corresponding threaded end (not shown) to be threadedly coupled to the lens housing 12. The lens housing extention 24 includes a pair of spaced raised abutments 26 formed thereon which results in a channel 28 (FIG. 3) being formed there between.

A multiple imaging attachment 30 is provided to be used in conjunction with the camera 10. The multiple imaging attachment 30 includes a housing 31. The housing 31 includes a coupler housing 32 to secure the multiple imaging attachment to the camera 10. As illustrated in FIG. 3 the coupler housing 32 is a hollow rectangular shaped member formed of a base 34 and a pair of covers 36 and 37. Formed in the sides and bottom of the base 34 is a pair of spaced grooves 38 and 40. The grooves 38 and 40 each receive and hold a pair of rectangular shaped locking members 42 and 44 (FIG. 4). The locking members 42 and 44 help to secure the coupler housing 32 to the lens housing extention 24.

The locking member 42 is formed with a portion 45 which fits in recesses 45a in the locking member 44 to interlock the two locking members. The locking members 42 and 44 are each formed with semicircular recessed portions 46 which fit in the upper and lower portions respectively of the channel 28. To secure the coupler housing 32 to the lens housing extention 24 the locking member 42 is slide in the lower part of the groove 38 in the base 34 and held adjacent to the lens housing extension in the channel 28. The locking member 44 is then slide into the upper part of the groove 38 so that the recessed portion 46 of the locking member is adjacent to the lens housing extention 24 in the channel 28. The cover 37 is then secured to the base 34 by couplers 48 to lock the coupler housing 32 to the lens housing extention 24. The recessed portions 46 of the locking members 42 and 44 cooperate with the channel 28 to secure the coupler housing 32 for rotation about the lens housing extension 24.

An abutment 47, including marking indicia 47a, is formed on the locking members 42 and 44 so that the abutment is above the abutments 26 when the locking members are in place in the coupler housing 32. This assists the user in rotating the coupler housing to desired positions.

Figure 10:
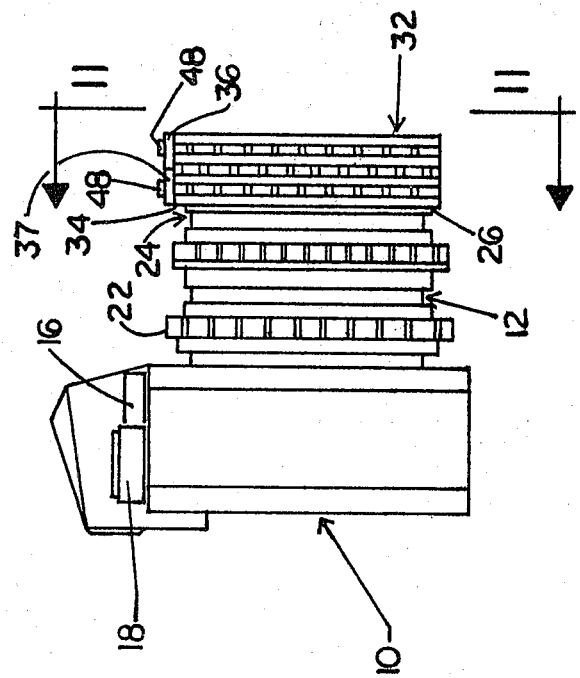
FIG. 10 is a side view of the camera and multiple imaging attachment illustrated in FIG. 9.

A slot 50 is formed in the base 34 of the coupler housing 32 to facilitate access to the hollow portion of the coupler housing. The base 34 of the coupler housing 32 is also formed with a pair of spaced aligned guiding tracks 52 located in opposite upper and lower corners of the base (FIG. 10).

Referring again to FIGS. 1 and 2 the housing 31 of the multiple imaging attachment 30 includes a hollow cylindrical shaped support housing 54 including intergrally formed front and end sections 56 and 58 having a hollow opening 60 extending therethrough. The front section 56 and end section 58 of the support housing 54 are formed so that the opening 60 is larger in the front section than in the end section. The end section 58 of the support housing 54 is attached to the coupler housing 32 with a pair of locking members 42 and 44 held in the groove 40 of the base 34 of the coupler housing. The recessed portions 46 of the locking membes 42 and 44 are held in the groove 40 to engage the surface of the end section 58 of the housing 54 by the cover 36 and coupler 48 of the coupler housing 32. This locks the housing 54 in a stationary position. The support housing 54 is locked to the coupler housing 32 so that the opening 60 formed therein is directly aligned with the lens 14 thereby providing a longitudinal light path through the opening to the lens.

The support housing 54 of the multiple imaging attachment 30 also includes a slot 62 formed therein for allowing a mask or light blocking member 64 to be inserted into the opening 60 of the support housing. The slot 62 has recesses 66 and 68 formed therein to accomadate the shape of the mask 64 and guarantee, unobstructed movement of the mask in the support housing 54. A plurality of semi-circularly shaped slots 70, 72 and 74 are formed on the surface of the support housing 54. These slots allow filters (not shown) to be inserted in the opening 60 in the support housing 54. One filter may for example allow the user to take pictures having different outlines or borders. Another filter might provide a desired tint to a picture being taken.

The mask 64 is held in alignment with the lens 14 in the opening 60 in the support housing 54. The mask 64 is held in the support housing 54 to move along a diagonal path which is defined by a pair of spaced raised abutments or tracks 79 formed in the support housing 54 to extend alone the outer periphery of the lens 14 at a forty-five degree (45°) angle.

As illustrated in FIG. 5 the mask 64 is formed of three masking sections 84, 86 and 88. Masking sections 84 and 86 of the mask 64 are each shaped to cover at least an area equal to approximately one fourth of the lens 14 of the camera 10. The masking sections 84 and 86 each have a spring biased pin 90 extending therethrough. The masking section 88 of the mask 64 is formed of a substantially rectangular support member 92 having an opening 94 formed therein and a section 96 formed in the opening. When the mask 64 is aligned and held in the slot 62 selected portions of the opening 94 will permit light to be transmitted from the opening 60 in the support 54 to the lens 14 to expose selected portions of film. The section 96 of the masking section 88 is substantially the same shape and size as the masking section 84 and 86 of the mask 54.

The support member 92 of the masking section 88 includes a plurality of spaced apetures 98 formed about the periphery thereof. The masking section 84 and 86 are aligned adjacent to support member 92 of the masking section 88 to permit portions of the outer extremities of each section to slightly overlap the section 96 and support member. This results in portions of the opening 94 always being uncovered for the transmission of light therethrough. Additionally the masking section 84 and 86 are aligned adjacent to the support member 92 so that the spring based pins 90 can always rest in an adjacent corresponding apeture 98 in the support member. The masking sections 84 and 86 are coupled to the section 96 of the masking section 88 and mounted thereto for rotation by spring biased fasteners 100. The spring biased fasteners 100 exert a force on the sections 84 and 86 that tends to push them toward the repective A positions. With this arrangement the sections 84 and 86 can be pivoted upon releasing the pins 90 by pulling strings 91 so that either one fourth, one third or one half of the opening 94 is uncovered. This will allow the transmission of light to different size portions of the lens 14 when the mask 64 is aligned in the opening 60 thereby allowing different numbers of pictures to be taken on a single film.

Inorder to provide a mask 62 with only one fourth of lens 14 covered the portions 84a and 86a of masking sections 84 and 86 respectively must be held by the spring brased pins 90 at correspondiing positions A as is illustrated in FIG. 5. This will provide light to expose only one fourth of a film frame at a time thus allowing multiple imaging with four exposures to each film frame. Inorder to enlarge the opening so that only one third of the lens 14 is covered and three exposures per film frame taken the portions 84a and 86a of the masking sections 84 and 86 respectively must be rotated to corresponding positions B illustrated in FIG. 5. Simularly if only one half of the lens is to be covered to allow two exposures per film frame the portion 86a of the masking section 86 must be held in position A and the portion 84a of the masking section 84 held in position C. When the mask 64 is set to achieve the desired number of exposures different portions of a film frame can be exposed by resetting the film as previously described and rotating the coupler housing 34 after each exposure so that light is transmitted to a different portion of the lens 14. The mask 64 also includes a plurality of spaced aligned tracks 102 which are formed vertically along the back of the rectangular support 90 of the masking section 88. The tracks 102 are formed with outer walls 104 and inside tracking slots 106. The tracks 102 are spaced a sufficient distance apart on the back of the support member 90 to allow the outer walls 104 thereof to engage the abutments 79 when the mask 64 is in the support housing 54 (FIG. 7). This secures the mask 64 in the housing 54 and allows the mask to be moved along the path defined by the abutments 79. That is the outer walls 104 of the tracks 102 cooperate with the abutments 79 formed in the support housing 54 to enable the mask 64 to be held in the housing 54 and slidably moved therein across the lens 14 along the path defined by the abutments 79 for reasons that will be explained.

A handle 107 having a gearing track 108 formed therein is formed on a front lower part of the rectangular support 90 of the masking section 88. A gear box 109 is mounted in the support housing 54 so that a gear (not shown) extends out of the gear box to engage the gearing track 108. A handle 109a forming a part of the gear box 109 and cooperating with the gears therein in a know manner can be moved laterally to cause the gear that engages the gearing tracks 108 to force the mask 64 to be moved up or down along the path defined by the abutments 79.

Referring to FIG. 6 the mask 64 is mounted for slidable movement in the support housing 54 along the path defined by the abutments 79 to allow for adjustment of the mask to compensate for changes in the amount of light transmitted to the lens 14 when the F/stops are changed during multiple imaging. The mask 64 should be aligned such that portions of the center 14a of the lens 14 always appears to be adjacent to and touching approximately the center of the mask 14. That is the center 14a of the lens 14 appears to approach and touch the intersecting point of the portions 84a and 86a of the mask 64. This will eliminate unwanted light components resulting from the change in the amount of light and thereby eliminate the marginal edges between exposures and give the appearance of blending in adjacent exposures. That is proper overlapping can be achieved even when the light components change with F/stop changes thus giving the appearance of simultaneous exposures.

By maintaining the mask 64 for slidable movement across the lens diagonally at a forty-five degree angle as defined by path of the abutments 79 the required relationship between the center of the mask 78 and lens can be maintained by sliding the mask along the path.

The amount of light used to expose the film has a definite effect upon the appearance of the relationship between the center 14a of the lens 14 and masks 64. The effects of changes in F/stops and thus changes in the amount of light while multiple imaging is illustrated in FIG. 8. The desired relationship between the mask and the center 14a of the lens is illustrated by the line D—D. This could for example represent the amount of light at F/stop setting F 8 used for the first exposure of the film. Inorder for proper overlapping to occur this relationship between the lens 14a and the mask 64 as defined by the line D—D must appear to be constant from exposure to exposure. If when exposing another portion of the same film frame the amount of light is increased, for example by changing the F/stop setting to F 4, the increased amount of light will make the mask 64 appear to have moved down with respect to the center 14a of the lens as illustrated by the dotted line E—E. If the exposure is taken without compensating for this change in light proper overlapping will not occur. Inorder to compensate for this increased amount of light and assure proper overlapping the mask 64 must be moved so that the center 14a of the mask again appears to be aligned with and tangential to the line D—D which represents the portions 84a and 86a of the mask 64. If on a subsequent exposure of a different portion of the same film frame the amount of light is decreased, such as for example by changing the F/stops from F 4 to F 16, this decreased amount of light will make the mask appear to have moved up with respect to the center 14a of the lens 14 as illustrated by the dotted lines F—F. Of course for proper overlapping in this instance the mask 64 must be moved downward to again make the mask appear to be aligned adjacent to center 14a of the lens 14 as illustrated by the lines D—D.

Figure 9:
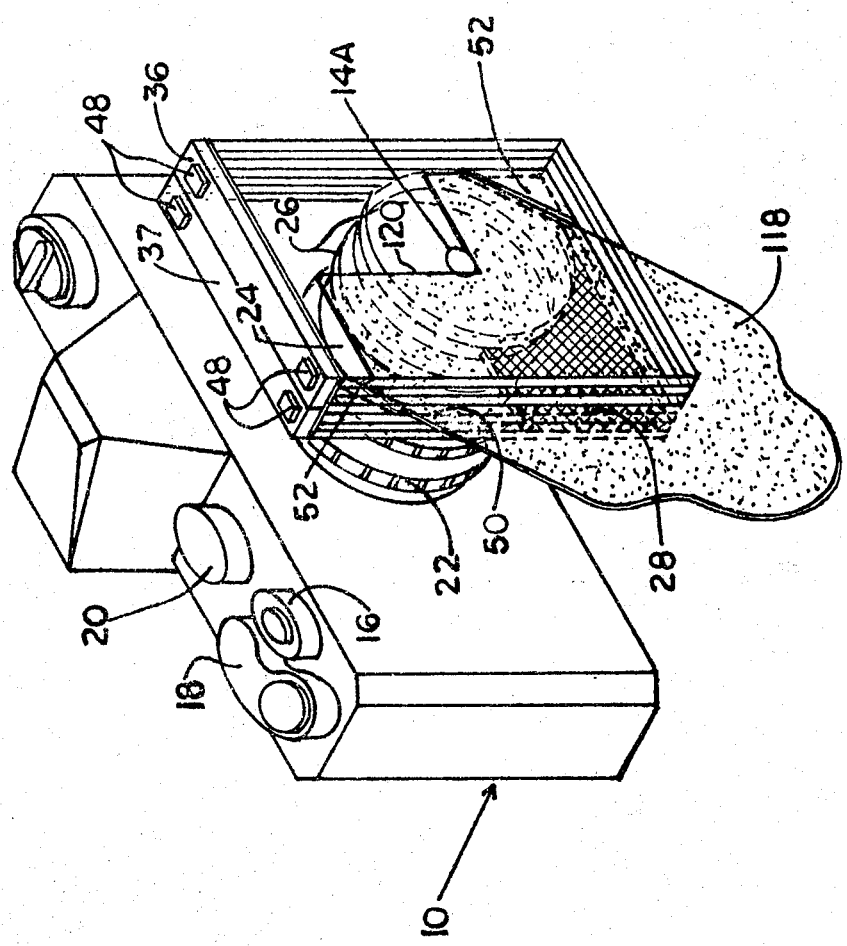
FIG. 9 is a perspective view of a camera and multiple imaging attachment illustrated for use with wide angle lens.

When utilizing a wide angle lens 14 during multiple imaging the support housing 54 is removed from the coupler housing 32 so that the lens field of view is not obstructed as illustrated in FIGS. 9, 10, 11. A masking member 118 is provided. The masking member 118 is inserted in the slot 50 of the coupler housing 32 to rest in the hollow portion of the coupler housing in the tracks 52. The masking member 118 when inserted in the tracks 52 is held adjacent to the lens 14 so that an opening 120 formed in the mask member 118 is aligned with the lens 14 in the same manner previously described with regard to the mask 64.

The mask member 118 is securely held for slidable movement in the tracks 52 of coupler housing 32.

The tracks 52 define a forty five degree path across the lens 14 so that the mask 118 can be moved across the lens to maintained the proper relationship between the mask and the lens.

Although the mask 118 is illustrated to provide for four exposure multiple imaging it should be understood that his mask may take on different shapes to provide for various numbers of exposures in accordance with the teaching herein without departing form the spirit of the invention.

It should be understood that various changes and modifications can be made without departing from the spirit of the invention as defined in the following claims.

What is claimed is:

1. A multiple imaging attachment to be utilized with a camera which is adjustable to provide varying amounts of light to the lens of the camera to expose the film comprising:
   a housing having an opening formed therethrough for allowing light to be transmitted longitudinally through the housing;
   means for masking the opening in the housing and for compensating for changes in the amount of light used to expose different portions of the film;
   means for adjusting the masking and compensating means to direct light to different sized portions of the lens so that varying numbers of exposures can be taken on the film;
   means for coupling the housing to the camera so that the opening in the housing is aligned to transmit light to the lens and for facilitating rotation of the masking and compensating means so that light is directed to selected portions of the lens, including:
   a first track formed in portions of a first section of the housing;
   a first pair of locking members held in the first track in alignment with and adjacent to selected portions of the camera so that the first section of the housing can be rotated thereon;
   a second track formed in another portion of the first section of the housing;
   a second pair of locking members held in the second track in alignment with and adjacent to a second section of the housing so that the second section of the housing is locked to the first section of the housing;
   means for facilitating movement of the masking and compensating means along a diagonal predetermined path in the housing so that when the amount of light is changed to expose different selected portions of the film the masking and compensating means can be moved a predetermined distance in the housing to compensate for changes in the amount of light used to expose the different portions of the film comprising:
   a pair of spaced abutments formed in the housing and aligned to extend along the outer periphery of the lens; and
   a pair of spaced tracks formed on the masking and compensating means, the spaced tracks on the masking and compensating means being aligned to engage and cooperate with the spaced abutments in the housing to secure the masking and compensating means for slidable movement in the housing between the spaced abutments.

2. A multiple imaging attachment to be utilized with a camera which is adjustable to provide varying amounts of light to the lens of the camera to expose the film comprising:
   a housing having an opening formed therethrough for allowing light to be transmitted through the housing;
   means for masking the opening in the housing and for compensating for changes in the amount of light used to expose different portions of the film comprising:
   a first portion having an opening formed therein for allowing light to be transmitted through the housing;
   a second portion formed in the opening for blocking the transmission of light through the opening of the first portion;
   a third portion aligned adjacent to the first portion and rotatably coupled to the second portion for blocking the transmission of light through a second portion of the opening;
   a fourth portion aligned adjacent to the first and second portion and coupled to the third portion for blocking the transmission of light through a third portion of the opening; and
   means having portions thereof included in the first portion and other portions thereof included in said third and fourth portions for releasably engaging said first portion to allow said third and fourth portions to be rotated to vary the size of the portions of the opening that will transmit light;
   means for coupling the housing to the camera so that the opening in the housing is aligned to transmit light to the lens and for facilitating rotation of the masking and compensating means so that light is directed to selected portions of the lens; and means for facilitating movement of the masking and compensating means along a predetermined diagonal path in the housing so that when the amount of light is changed to expose different selected portions of the film the masking and compensating means can be moved a predetermined distance in the housing to compensate for changes in the amount of light used to expose the different portions of the film.

3. A method of taking multiple images on a single film frame of a camera including the steps of:

positioning a mask adjacent to the camera lens to allow the transmission of light to a predetermined portion of the lens to facilitate exposure of a selected portion of the film frame;

aligning selected predetermined portions of the mask with a selected predetermined portion of the camera lens;

exposing the selected portion of the film frame;

aligning the film frame with the camera lens to allow another exposure thereon;

positioning the mask adjacent to the camera lens to allow the transmission of light to another predetermined portion of the camera lens to facilitate exposure of a different portion of the film frame;

adjusting the camera to change the amount of light being transmitted to the camera lens;

moving the mask a predetermined distance along a diagonal predetermined path adjacent to the camera lens to compensate for the change in the amount of light transmitted to the camera lens; and exposing the different portion of the film frame.

* * * * *

UNITED STATES PATENT AND TRADEMARK OFFICE
CERTIFICATE OF CORRECTION

PATENT NO. : 4,423,939            Page 1 of 2

DATED : January 3, 1984

INVENTOR(S) : David C. Hayles

It is certified that error appears in the above—identified patent and that said Letters Patent is hereby corrected as shown below:

Column 2, line 2, delete "Hood" and insert therefor --hood--.

line 42, delete "alone" and insert therefor --along--.

Column 3, in the heading, delete "DRAWING" and insert therefor --DRAWINGS--.

line 2, delete "drawing" and insert therefor --drawings--.

line 19, delete "take" and insert therefor --taken--.

Column 4, lines 9, 15 and 18 delete "extention" and insert therefor --extension--.

lines 10 and 13 delete "slide" and insert therefor --slid--.

lines 36-37 delete "intergrally" and insert therefor --integrally--.

line 58-59 delete "accomadate" and insert therefor --accommodate--.

Column 5, line 6 delete "alone" and insert therefor --along--.

lines 49 and 56 delete "Inorder" and insert therefor --In order--.

Column 5, line 52 delete "brased" and "correspondiing" and insert therefore --biased-- and --corresponding--, respectively.

UNITED STATES PATENT AND TRADEMARK OFFICE
CERTIFICATE OF CORRECTION

PATENT NO. :  4,423,939

DATED  :  January 3, 1984

INVENTOR(S) :  David C. Hayles

It is certified that error appears in the above-identified patent and that said Letters Patent are hereby corrected as shown below:

Column 5, line 60-61 delete "Simularly" and insert therefor --Similarly--.

Column 6, line 21, delete "in" and insert therefor --on--.

line 25, delete "know" and insert therefor --known--.

line 62, delete "Inorder" and insert therefor --In order--.

Column 7, line 4, delete "Inorder" and insert therefor --In order--.

line 36, delete "maintained" and insert therefor --maintain--.

line 40, delete "his" and insert therefor --this--.

line 42, delete "form" and insert therefor --from--.

Signed and Sealed this

Twenty-second Day of May 1984

[SEAL]

Attest:

*Attesting Officer*

GERALD J. MOSSINGHOFF

*Commissioner of Patents and Trademarks*